United States Patent

[11] 3,615,796

| [72] | Inventor | Hans G. Schreuders |
| | | Park Forest, Ill. |
| [21] | Appl. No. | 855,367 |
| [22] | Filed | Sept. 4, 1969 |
| [45] | Patented | Oct. 26, 1971 |
| [73] | Assignee | Nalco Chemical Company |
| | | Chicago, Ill. |

[54] ANIONIC QUICK-SET ASPHALT EMULSION
3 Claims, No Drawings

[52] U.S. Cl. .................................................. 106/277, 94/23, 106/283, 252/311.5

[51] Int. Cl. .................................................. C08h 13/00, C08k 1/62, C09d 3/24

[50] Field of Search ........................................ 106/277

[56] References Cited
UNITED STATES PATENTS

| 2,503,246 | 4/1950 | Craig .......................... | 106/277 X |
| 2,730,506 | 1/1956 | Sommer ...................... | 106/277 X |
| 2,773,777 | 12/1956 | Alexander et al............ | 106/277 X |
| 3,344,082 | 9/1967 | Montgomery et al........ | 106/277 X |

*Primary Examiner*—Julius Frome
*Assistant Examiner*—Joan B. Evans
*Attorneys*—Kinzer, Dorn & Zickert, John G. Premo and Charles W. Connors

ABSTRACT: Quick setting of a bituminous emulsion for slurry seal repair of asphalt road surfaces is achieved by using a water-soluble alkyl petroleum sulfonate salt (Na) as the emulsifying agent.

ANIONIC QUICK-SET ASPHALT EMULSION

This invention relates to so-called slurry sealing of asphalt or concrete surfaces and more particularly to preparation of an asphalt emulsion for efficiently producing such seals or coatings.

It is a customary practice to repair deteriorated surfaces such as roads and runways by spreading on the surface a slurry which essentially is a mixture of a finely graded aggregate, an asphalt emulsion, and water. The slurry may also include a mineral filler which helps in the setting of the slurry and also provides a more uniform consistency of the slurry. Ideally, the mixture should possess several important attributes: first, the emulsion phase should not break until after the mixture is applied for resurfacing, which means in a practical sense that the emulsion should be highly stable and not susceptible to premature breaking in the course of mixing it with the other ingredients; and secondly, the emulsion should break quickly after application, releasing the asphalt sealer. When the emulsion breaks, clear water is released. Thus, the release of clear water following application is an indication to the job superintendent that the asphalt constituent of the emulsion has settled out and sealed the crack and that the surface is ready to accept traffic.

A stable but quick-setting bituminous emulsion for such purposes is therefore of advantage, which is to say that the road surface should not be opened to traffic until after clear water has been released from the mixture used for resurfacing. The primary object of the present invention is to provide a stable quick-setting bituminous emulsion of the anionic type for slurry sealing of asphalt road surfaces, and to do this by employing an emulsifying agent in the form of a petroleum sulfonate salt which has been found to produce stability during mixing as well as setting within 5 minutes following application.

Petroleum sulfonates have heretofore been proposed as emulsifying agents for bituminous slurry compositions, but their utilization has been quite limited due to a cost factor entailed in the proposition that modification of the sulfonate is required to produce a so-called fast break. Under Canadian Pat. No. 810,102, for example, an alkylaryl petroleum sulfonate must be modified with ethylene oxide to produce a stable emulsion. Another example is French Pat. No. 1,436,589 where several different ingredients are included to modify the sulfonate including maleic anhydride and Vinsol Resin.

Under the present invention, I have found that by using a water-soluble alkyl or straight chain petroleum sulfonate of molecular weight not in excess of about 300 to 360 ($C_{12}$-$C_{24}$) the sulfonate may be used in unmodified form and accounts for both a stable emulsion (during mixing) and one which will produce a slurry seal coating which will set in about 5 minutes after application to the surface to be repaired.

The emulsions obtained in accordance with the invention are especially valuable when used in slurry sealing since they are very effective in sealing and waterproofing due to strong adhesion properties. The remarkable properties of the emulsifier of this invention not only help to form a mixing stable asphalt emulsion but also help to deposit asphalt particles rather rapidly in almost any aggregate because of the polar charges of the emulsion droplets. This quick-setting property of the slurry is very advantageous in road-building applications, since the roads can be open to traffic shortly after application.

The emulsion according to the present invention makes it possible to produce not only a shelf stable emulsion (0.05 percent sediment at 5 days' settlement test) but it also has the capability to evenly coat a wide variety of aggregates falling into the three great groups of igneous sedimentary and metamorphic type of rocks. Stable emulsions can therefore be mixed with an aggregate without breaking compared to conventional slow-breaking emulsions which principally and generally break by evaporation when the water content falls below the critical level, and also by absorption of the water by the aggregate. This may take a considerable time depending on factors such as weather condition, temperature of the treated surface, absorption of the aggregate and many others. Any rain that falls, before breaking occurs, will wash the unbroken emulsion away leaving the aggregate stripped from its binder. These factors are of no concern under the present invention.

Other and further objects of the present invention will be apparent from the following description and claims which, by way of illustration, show a preferred embodiment of the present invention and the principal thereof and what is not considered to be the best mode contemplated for applying that principle. Other embodiments of the invention embodying the same or equivalent principles may be made as desired by those skilled in the art without departing from the present invention.

One customary procedure incidental to depositing a slurry seal emulsion of the kind involved is to first prepare the bituminous emulsion and store it in a tank of a slurry seal truck. The same truck has separate containers for water, the aggregate and the mineral filler. The truck is also equipped with a spray bar for depositing water on the road surface ahead of the slurry seal mixture. Inside the truck there is a conveyor belt which drops the aggregate into a lower compartment for mixing, while being sprayed with water, and concurrently the mineral filler, prewet water and emulsion is proportionally fed with the aggregate into the mixing compartment. The slurry seal mixture as thus prepared is applied to the road surface. The aim is to have the slurry penetrate the crack and not merely bridge it.

Examples 1 and 2 immediately following represent a preferred form of the invention. Certain conventional ingredients are employed including Portland cement, which helps to break the emulsion by chemical phenomenon, and an aggregate in the form of finely crushed stone.

Example 1—Bituminous Emulsion

| | Parts by Weight) | Range |
|---|---|---|
| Water | 34.96 | 33-37 |
| Asphalt (e.g. penetration 40-120) | 63.00 | 59-66 |
| NaOH (50% Be for pH of about 10.4) | 0.04 | — |
| Alkyl ($C_{12}$-$C_{24}$) petroleum sulfonate salt (na), molecular weight 300-360 | 2.00 | 0.8-2.0 |

Example 2—Slurry Seal Mixture

| | (Parts by Weight) | Range |
|---|---|---|
| Aggregate | 72.00 | 70-74 |
| Water | 13.00 | 5-15 |
| Portland cement | 0.12 | 1/8-1.0% based on the aggregate |
| Emulsion (example 1) | 15.00 | 10-20 |

The aggregate is actually crushed granite dust, finely divided, which subscribes to ASTM Specification C136-46 as follows:

| Sieve Size | Percent Passing |
|---|---|
| 4 | 100 |
| 8 | 99 |
| 16 | 84 |
| 30 | 59 |
| 50 | 33 |
| 100 | 17 |
| 200 | 6 |

The cement preferably subscribes to ASTM Specification C150, Type I. The cement furnishes positive ions to encourage quick setting. The emulsion constituents, example 1, after combination are rendered into an emulsion in a conventional colloid mill. The emulsion remains stable, even during preparation of the slurry seal in the mixing compartment described above, and when combined into the slurry seal mixture (example 2) and spread on the road surface will produce setting of the asphalt constituent by actual field tests, within 4 to 5 minutes. The setting time may be controlled by adjusting the amount of cement. Thus, more cement accelerates setting. The amount of cement (example 2) is preferably in the range of one-eighth to 1.0 percent of the dry weight of the aggregate, and on the same basis the amount of asphalt (example 1 may be 10 percent to 16 percent.

It is to be emphasized that the emulsion in this instance is a hydrophilic anionic emulsion, and because of the hydrophilic character adverse weather conditions characterized by precipitation will not alter significantly the setting time one way or the other. Thus while the setting time is encouraged by the evaporation of water as a physical phenomenon, nonetheless the critical factor for setting time may be controlled principally through the amount of cement employed in the slurry seal mixture. The molecular weight of the alkyl straight chain petroleum sulfonate, in the range specified, is apparently responsible for producing an HLB factor which both encourages stability of the mixture and quick setting after application to the surface to be repaired without the necessity of costly modifiers under the prior art disclosures referred to above. In this connection it may be observed that a standard ASTM settling or sedimentation test, deemed a measure of stability of an asphalt emulsion, applied to the present emulsion reveals a settlement of only 0.01 weight percent asphalt, but the same test applied to an asphalt emulsion using unmodified dodecyl benzene sulfonate produces a settlement of 3 to 15 percent which can be lowered to a more practical value only by chemical modification of the sulfonate, as is disclosed in the two patents mentioned above.

Quite naturally the precise amounts of ingredients and the pH may be varied widely by those skilled in the art, dependent upon such factors as the type of asphalt, the nature of the aggregate, the quality of the surface being repaired and the setting time which may be preselected. Hence while the preferred embodiment of the present invention has been specified it will be appreciated that this is subject to variation and modification without departing from the principle of the present invention.

I claim:

1. A hydrophilic anionic bituminous emulsion for slurry sealing of asphalt road surfaces consisting of water and asphalt emulsified with an alkyl straight chain $C_{12}$-$C_{24}$, petroleum sulfonate sodium salt, the sulfonate being the emulsifying agent said emulsion having the materials in the following approximate proportions by weight:

Water—33–37
Asphalt—59–66
sulfonate—0.8–2.

2. An emulsion according to claim 1 in which the molecular weight of the sulfonate is from about 300–360.

3. A slurry seal mixture consisting essentially of an emulsion according to claim 1, an aggregate and Portland cement, in which the sulfonate in the emulsion is of molecular weight about 300–360, and in which the materials are present in the following parts by weight:

emulsion—10–
aggregate—70–74
water—5–15
Portland cement—1/8–1.0 percent based on the aggregate.

* * * * *

CERTIFICATE OF CORRECTION

Patent No. 3,615,796                            Dated October 26, 1971

Hans G. Schreuders

It is certified that error appears in the above identified patent and that said Letters Patent are hereby corrected as shown below:

> In the Specification, Column 2, line 69, in the column entitled "Sieve Size", insert the numeral --50-- under "30".
>
> In the Claims, Column 4, line 15, insert --( )-- around the chemical formula "$C_{12}$-$C_{24}$"; line 29, add the numeral --20-- after "10-".

Signed and sealed this 18th day of April 1972.

(SEAL)
Attest:

EDWARD M. FLETCHER, JR.          ROBERT GOTTSCHALK
Attesting Officer                  Commissioner of Patents